United States Patent

Overbey

[15] 3,669,357
[45] June 13, 1972

[54] INJECTION AND DISTRIBUTION UNIT FOR A LAWN SPRINKLER SYSTEM

[72] Inventor: Charles A. Overbey, 16 Bougainvillea Drive, Cocoa Beach, Fla. 32931

[22] Filed: Aug. 19, 1970

[21] Appl. No.: 65,143

[52] U.S. Cl. ........................... 239/310, 239/269, 239/272, 239/318
[51] Int. Cl. ........................... A62c 5/02, B05b 7/26
[58] Field of Search .................. 239/179, 310, 207, 266, 304, 239/305, 271, 272, 450, 311, 315, 316, 318; 285/5

[56] References Cited

UNITED STATES PATENTS

| | | | |
|---|---|---|---|
| 2,944,561 | 7/1960 | Sellati | 239/310 X |
| 2,931,580 | 4/1960 | Johnson | 239/311 X |
| 3,333,601 | 8/1967 | Lofgreen | 239/318 X |
| 3,361,359 | 1/1968 | Chapin | 239/269 X |
| 3,361,363 | 1/1968 | Babington | 239/266 X |
| 3,370,571 | 2/1968 | Knapp | 239/310 X |
| 3,374,955 | 3/1968 | Hester | 239/145 |
| 3,375,976 | 4/1968 | Stamps et al. | 239/310 X |
| 3,504,702 | 4/1970 | Collins et al. | 239/318 X |

FOREIGN PATENTS OR APPLICATIONS

| | | | |
|---|---|---|---|
| 926,639 | 4/1955 | Germany | 239/310 |

*Primary Examiner*—Lloyd L. King

[57] ABSTRACT

An injection and distribution unit for a lawn sprinkler system. The unit, which includes a reservoir, transfer tube and connector, injects liquid fertilizers and pesticides into the lawn sprinkler system. The fertilizer or pesticide is injected upstream of the pump and is mixed with water passing through the sprinkler system and distributed to the lawn or to nursery stock. The injection and distribution unit does not materially reduce flow through the system and is easily connected to existing pump suction pipes made of galvanized iron, polyvinal chloride (PVC), polyethylene and other materials.

7 Claims, 11 Drawing Figures

INVENTOR.
CHARLES A. OVERBEY

INVENTOR.
CHARLES A. OVERBEY

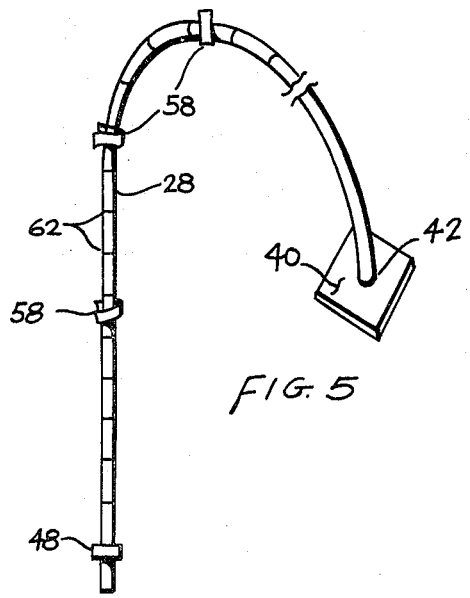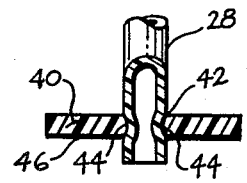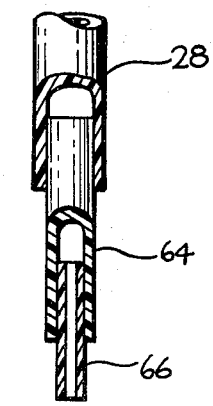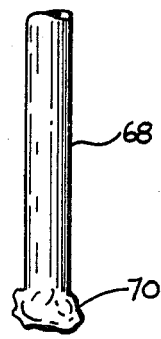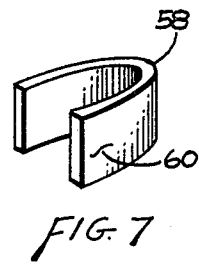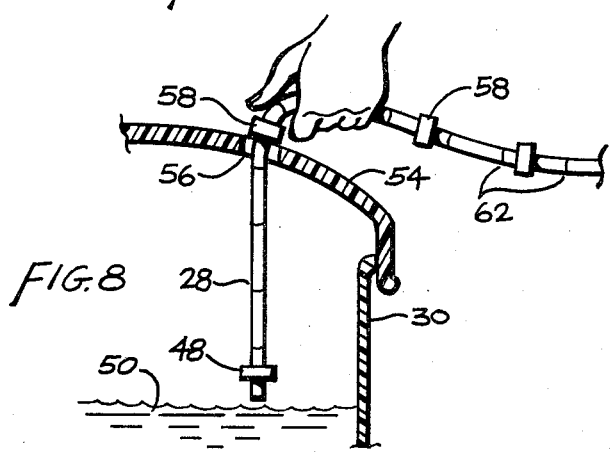
INVENTOR.
CHARLES A. OVERBEY

INJECTION AND DISTRIBUTION UNIT FOR A LAWN SPRINKLER SYSTEM

The present invention relates to the injection and distribution of liquid fertilizers or pesticides through a sprinkler system to a lawn or to nursery stock.

More particularly, the invention entails the injection of liquid fertilizers or pesticides into a sprinkler system upstream of a pump, whereby the liquid is mixed with water flowing through the pump and piping and is distributed to the lawn or nursery stock through the sprinkler heads. This injection and distribution unit effects a large reduction in time-consuming work and effort on the part of the homeowner in fertilizing or treating his lawn. Further, it promotes healthy lawn and plant growth by permitting an economical distribution of a controlled amount of plant food and/or pesticide each time the sprinkler system is operated.

The invention permits the user to vary the total amount of liquid going into the sprinkler system, to alter the concentration of the solution going into the system, or, if he desires, to skip the process entirely. The injection and distribution unit embodied in this invention permits easier and broader use of liquid fertilizers and pesticides now available on the market. It will also stimulate a greatly expanded use of dry water-soluble fertilizers which may be obtained by the user at less cost in the dry form and simply dissolved in a container or reservoir, which is a part of the system discussed herein. Existing venturi-action liquid fertilizer injectors sometimes impose an appreciable loss of flow on the overall water distribution system. With the present invention such losses are eliminated or are negligible.

Other methods and customary apparatus currently used by homeowners for distributing fertilizer to lawns are: application of dry fertilizer by means of a hopper which is pushed back and forth over the lawn, broadcasting of dry fertilizer by hand, and dispensing of liquid fertilizer by means of a small container of approximately one quart size with a venturi-type spray head attached to a garden hose. These methods have the following distinct disadvantages. The application of dry fertilizer by means of a hopper is laborious in that the loaded hopper is heavy and hard to push back and forth over the lawn. This process, and that of broadcasting by hand require washing of the dry fertilizer from the grass blades after application is made so the fertilizer will not burn the grass. Further, in addition to the time and effort required, both processes cause overfertilization or streaking where applications overlap or where fertilizer is not deposited. Use of the venturi-type spray head attached to a garden hose requires that a homeowner drag a full garden hose back and forth over the lawn as he sprays. It also requires disconnection and shifting of the hose from the front yard to the back yard. Because of practical limitations on size and weight, frequent stops are required to unscrew the quart container from the spray head and refill it with liquid fertilizer. To properly cover a lawn as many as six or seven stops to refill the container or shift the hose may be necessary. Use of this type of liquid fertilizer dispenser also cuts down on the flow of water through the overall system, which adds to the time needed to accomplish the task. There are other variations of this type of dispenser, but they all offer substantially the same disadvantages.

Some large commercial growers use built-in commercial-type injectors which operate on the venturi principle using the pressure side of a pump. These particular injectors reduce overall flow through the water distribution system and cost several hundred dollars.

An object of the present invention is to overcome these disadvantages and provide a low-cost liquid fertilizer injection and distribution unit that will reduce the labor and time involved in distributing fertilizer to a lawn.

Another object is to provide a means for gaging and limiting the total quantity of liquid fertilizer to be dispensed in one application, a means for altering the concentration of the solution being dispensed, and a visual and audible signal when the predetermined quantity has been dispensed.

Still another object is to provide the user an easy means for applying fertilizer each time the lawn is watered, or to skip the application entirely.

A further object is to provide a simple means for dissolving and diluting dry water-soluble fertilizer so that it may be economically applied in weak form on a more frequent basis than has heretofore been achieved, and with less overall labor.

A still further object of this invention is to provide a simple means for attachment of the fertilizer injection and distribution unit to existing or new sprinkler systems wherein the pump suction pipe may be made of either metal, as for example, galvanized or copper pipe, or of plastic, such as polyvinyl chloride (PVC) or polyethylene pipe.

In addition to the foregoing, the invention is simple, reliable and economical to use. It is long lasting, has no moving parts, requires no extensive plumbing changes, is low in initial cost and requires minimal attention on the part of the user.

These and other objects and advantages will become more apparent from the following specification and the accompanying illustrative but not restrictive drawings.

FIG. 5 is a perspective view showing the transfer tube assembly.

FIG. 6 is a slightly enlarged partial sectional view of the seal and transfer tube.

FIG. 7 is a perspective view showing a depth adjuster.

FIG. 8 is a partial sectional view of the reservoir showing transfer tube being adjusted therein.

FIG. 9 is partial, enlarged sectional view showing multiple orifices inserted in the end of the transfer tube.

FIG. 10 is an enlarged side elevational view of the plug for use with the transfer tube.

Figure 1:
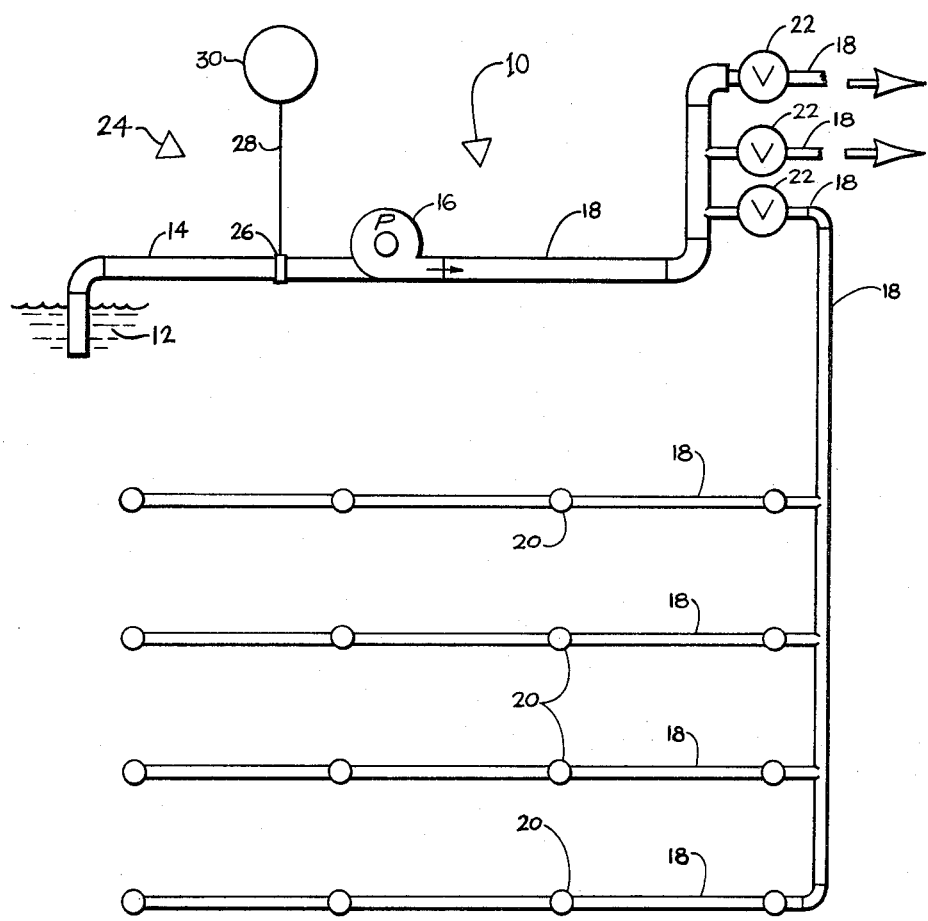
FIG. 1 is a schematic showing the injection and distribution unit used in conjunction with a conventional sprinkler system.

With reference to FIG. 1, a lawn sprinkling system, designated generally by reference numeral 10, is illustrated with the present invention incorporated as a part of the overall system. The reference numeral 12 designates a well, lake or other source of water for use in connection with the lawn sprinkling system 10. The lawn sprinkling system 10 includes a suction line or tube 14 for supplying water from the water source 12 to a pump 16. To the output side of the pump 16 is connected distribution piping 18 for carrying water to a plurality of sprinkler heads 20. In the various sections of the distribution piping 18 are valves 22 for selectively shutting off the water to the different sections of the lawn, for example, the front, back and side lawns. Sprinklers in only one section of the lawn are shown for purposes of clarity.

The lawn sprinkling system 10 includes a fertilizer injection and distribution unit, designated generally by reference numeral 24, which is connected to the suction line 14 of pump 16 in a manner to be more fully described hereinafter. The fertilizer injection and distribution unit 24 consists of a connector 26, transfer tube 28 and reservoir 30.

Figure 2:
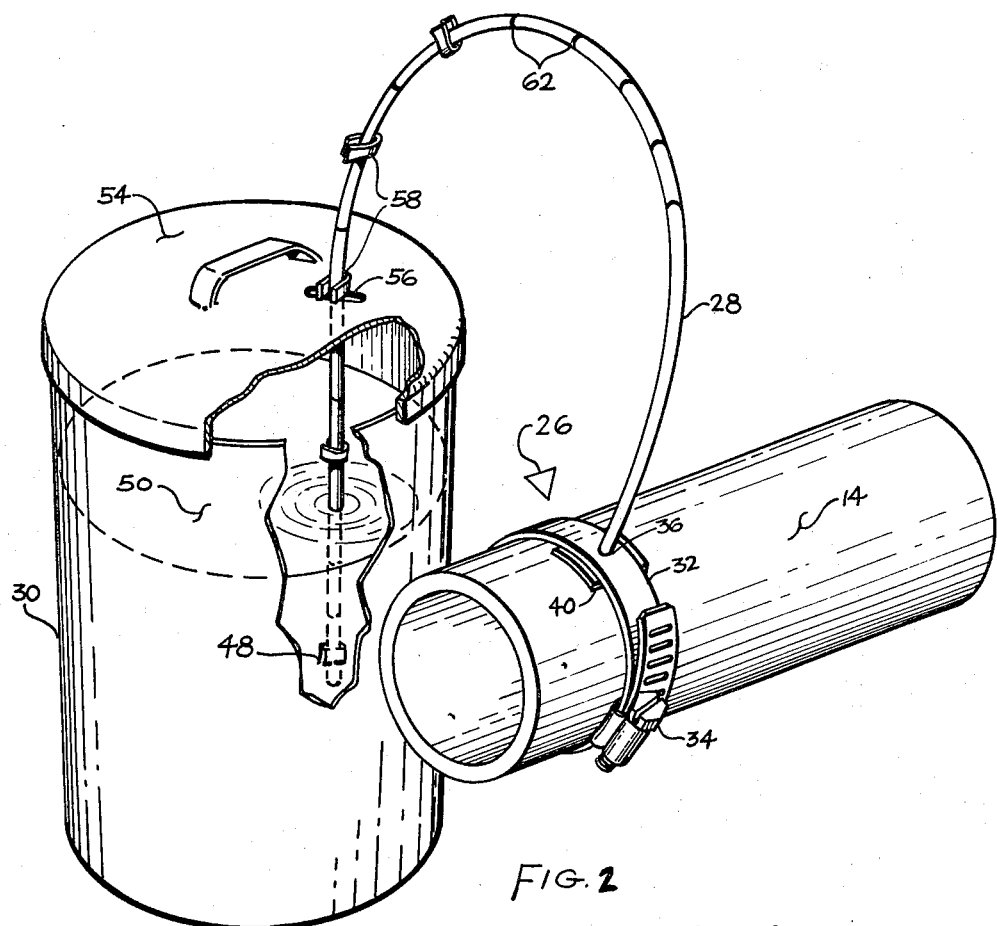
FIG. 2 is a perspective view of the injection and distribution unit.
Figures 3, 4:
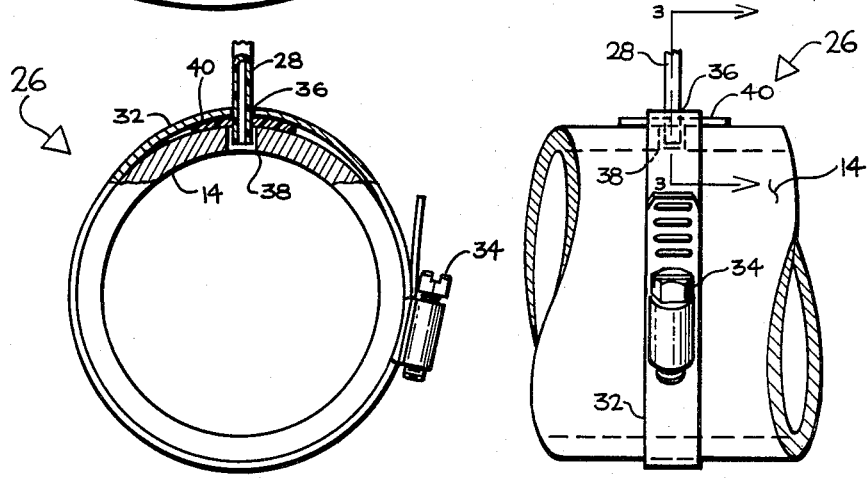
FIG. 3 is a partial sectional view taken along the line 3—3 in FIG. 4.
FIG. 4 is a side elevational view of the connector shown in FIG. 3.

As shown in FIGS. 2, 3 and 4, the connector 26 includes a thin metal band 32 having an adjustment screw 34. A hole 36 is provided in the metal band 32 for receiving transfer tube 28. The transfer tube 28 is shown connected to the suction line 14 by means of the connector 26. The end of the transfer tube 28 is inserted in a small hole 38 drilled in the periphery of suction line 14. To prevent leakage of air and water through the hole 38, the end of the transfer tube 28 is provided with a resilient seal 40. With reference to FIGS. 5 and 6, the transfer tube 28 is constructed of plastic which is forced through a small hole 42 punched in the resilient seal 40 giving a sealing surface 44 between transfer tube 28 and seal 40. Surface 46 of seal 40 provides a seal when it is forced against the outer surface of suction line 14 when connector 26 is tightened by manipulation of adjustment screw 34 in FIG. 3.

As illustrated in FIG. 3, it is not required that the end of transfer tube 28 extend completely beyond the sidewall of suction line 14 into the pipe cavity. Accordingly, restriction of flow is negligible. A further distinct advantage of this attachment means of the invention is that quick, simple and reliable attachment may be made to galvanized, polyvinyl chloride (PVC), polyethylene or other types of pipe. It is apparent that this capability greatly enhances the usefulness of the invention in that attachment may be made to many existing sprinkler system installations. Although plastic is mentioned as the material of transfer tube 28, other materials are suitable.

FIG. 5 shows transfer tube 28 with weight 48 attached near one end. This weight, which may be made of lead or other material, keeps the end of transfer tube 28 immersed in the liquid. This is better seen in FIG. 2, where 50 denotes the surface of the liquid in reservoir 30.

Again referring to FIG. 2, reservoir lid 54 has hole 56 through it to permit passage of transfer tube 28. Hole 56 is sized to permit the forcing of a depth adjuster 58 through the hole by hand; however the size of hole 56 is such that a depth adjuster 58 will not fall through of its own accord.

FIG. 7 illustrates a depth adjuster 58 made of soft lead. It is attached to transfer tube 28 by placing it around the tube and squeezing on opposing sides at general area 60 and thereby deforming it so that it fits closely around transfer tube 28. This is accomplished in such manner that flow through transfer tube 28 is not adversely affected. When desired, depth adjusters 58 may be loosened with the fingers and shifted to other locations axially along transfer tube 28. In FIGS. 2, 5 and 8 graduations 62 are shown on transfer tube 28 as an aid in gauging depth. FIG. 8 illustrates the technique of pushing of a depth adjuster 58 through hole 56 in reservoir lid 54.

FIG. 9 shows closely fitting orifice tubes 64 and 66 inserted in transfer tube 28. A single orifice tube 64 or multiple orifice tubes 64 and 66 are used to reduce the rate of flow of liquid through transfer tube 28. The invention provides also for transfer tubes 28 of different sizes, permitting the user to acquire an injection and distribution unit with a larger or smaller than nominal transfer tube 28. Where even larger flows are required the user may install more than one injection and distribution unit and thereby have more than one transfer tube 28 conduct liquid to the sprinkler system.

In some instances, as, for example, when water source 12 is a free-flowing artesian well, it may be desirable to close off flow at the free end of transfer tube 28. Referring to FIG. 10, this is accomplished by inserting plug 68 made from a piece of close fitting tubing by melting end 70 by means of a flame so as to completely close it off.

Figure 11:
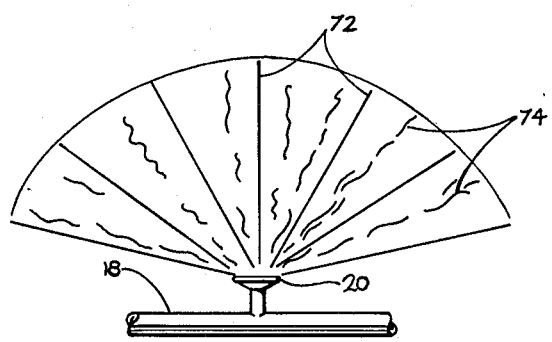
FIG. 11 is a schematic of normal and erratic spray patterns from a conventional sprinkler head.

FIG. 11 shows a conventional sprinkler head 20 producing a typical spray pattern 72. When the liquid has been dispensed from reservoir 30 to the extent that the end of transfer tube 28 is exposed to the atmosphere, a small amount of air is injected by atmospheric pressure into the sprinkler system through transfer tube 28. The air is discharged with water at a sprinkler head 20 near the pump and causes a "spitting" sound and/or a slight erratic action of the spray pattern 74 at this particular sprinkler head. The "spitting" sound and/or erratic action of spray pattern 74 provide an audible and/or visual signal to the user that the predetermined amount of liquid has been dispensed. The user may then elect to continue watering the lawn; in which case he does nothing, since the small amount of air entering the system will do no harm; or, if he so decides, he easily brings on the next increment of fertilizer application by pushing depth adjuster 58 through hole 56 (FIG. 8) in reservoir lid 54, thus lowering transfer tube 28 further into reservoir 30 and permitting transfer tube 28 to be suspended by the next higher depth adjuster 58.

Should the user desire to alter the concentration of the liquid in reservoir 30, he may do so at any time by adding fertilizer or water.

Operation of the system by the user is described as follows. Dry water-soluble fertilizer or concentrated liquid fertilizer is placed in reservoir 30 and water is added vigorously to disolve the fertilizer and make a diluted mixture. When pump 16 is operated the liquid is continuously injected into sprinkler system 10 until the first increment is used, at which time a small amount of air is injected into sprinkler system 10 causing an audible and/or visual signal to be detected. The user then changes the output to another section of the lawn by manipulation of valves 22 and introduces the next increment of fertilizer by pushing depth adjuster 58 through reservoir lid 56.

Although use of the invention in conjunction with injection of fertilizers and pesticides has been described, it is apparent that it may be used with other liquids or with gasses. Connector 26 and transfer tube 28 may be used on a pressure system as a device to permit discharge of liquids or gasses. Connector 26 and transfer tube 28 may be used to provide a sensing system for instrumentation (for example for a manometer or gage) or feedback for a control system as well as in many other common or specialized applications.

Although preferred embodiments of the invention have been described in detail, it is contemplated that modifications of the apparatus and method may be made and some features may be employed without others, all within the spirit and scope of the invention.

I claim:

1. A liquid injection and distri-bution device for use with a lawn sprinkling system having a suction line, water pump and distribution piping, comprising:
   A. a transfer tube having one end thereof adapted to communicate with a hole provided in said suction line;
   B. a substantially flat seal connected to said one end of said transfer tube;
   C. said seal having one surface thereof adapted to conform to the curvature of the outer surface of the suction line adjacent said hole;
   D. means engaging the other surface of said seal for clamping said seal and said transfer tube to said suction line; and
   E. the other end of said transfer tube adapted to communicate with a liquid source; whereby the liquid from said liquid source is automatically injected and mixed with the water being pumped by said water pump into said distribution piping.

2. A lawn sprinkling system as defined in claim 1 wherein said seal is constructed of a resilient material having a hole through which said one end of said transfer tube has been force-fitted.

3. A liquid injection and distribution device as defined in claim 1 wherein said transfer tube includes detachable orifice means insertable in said other end of said transfer tube for reducing the rate of flow of liquid through said transfer tube.

4. In combination with a lawn sprinkling system including a suction line, water pump and distribution piping;
   A. a hole provided in said suction line;
   B. a transfer tube having one end thereof extending into said hole;
   C. a seal adjacent to one end of said transfer tube;
   D. means for clamping said seal and said transfer tube to said suction line, including;
      1. a metal band surrounding said suction line;
      2. a hole in said metal band through which extends said transfer tube; and
      3. an adjustment screw attached to said metal band for contracting said metal band thereby clamping said seal against the outer surface of said suction line; and
   E. a liquid reservoir into which is extended the other end of said transfer tube; whereby the liquid in said liquid reservoir is automatically injected and mixed with the water being pumped by said water pump into said distribution piping.

5. In combination with a lawn sprinkling system including a suction line, water pump and distribution piping;
   A. a hole provided in said suction line;

B. a transfer tube having one end thereof extending into said hole;
C. a seal adjacent to one end of said transfer tube;
D. means for clamping said seal and said transfer tube to said suction line; and
E. a liquid reservoir into which is extended the other end of said transfer tube; whereby the liquid in said liquid reservoir is automatically injected and mixed with the water being pumped by said water pump into said distribution piping;
F. said transfer tube including adjustment means for preselecting the depth to which said other end of said transfer tube is inserted in said liquid reservoir;
G. said liquid reservoir including a cover having a hole therein for insertion of said transfer tube;
H. said adjustment means including clamps located at spaced intervals along said transfer tube which are normally adapted to rest on the top surface of said cover and then forced through said hole in said cover to adjust the depth of said transfer tube in said liquid reservoir.

6. In combination with a lawn sprinkling system including a suction line, water pump and distribution piping;
A. a hole provided in said suction line;
B. a transfer tube having one end thereof extending into said hole;
C. a seal adjacent to one end of said transfer tube;
D. means for clamping said seal and said transfer tube to said suction line; and
E. a liquid reservoir into which is extended the other end of said transfer tube; whereby the liquid in said liquid reservoir is automatically injected and mixed with the water being pumped by said water pump into said distribution piping;
F. said transfer tube including adjustment means for preselecting the depth to which said other end of said transfer tube is inserted in said liquid reservoir;
G. said adjustment means adapted to secure said transfer tube at a preselected depth in said liquid reservoir whereby as the liquid drops below said other end of said transfer tube air will be injected into said distribution piping causing automatic audio and visual signals to be detected in the lawn sprinkling system.

7. A liquid injection and distribution device for use with a lawn sprinkling system having a suction line, water pump and distribution piping, comprising:
A. a transfer tube having one end thereof adapted to communicate with a hole provided in said suction line;
B. a seal adjacent to one end of said transfer tube;
C. a band surrounding said suction line;
D. a hole in said band through which extends said transfer tube;
E. an adjustment means attached to said band for contracting said band thereby clamping said seal to said suction line; and
F. the other end of said transfer tube adapted to communicate with a liquid source; whereby the liquid from said liquid source is automatically injected and mixed with the water being pumped by said water pump into said distribution piping.

* * * * *